United States Patent [19]

Knorre et al.

[11] 4,172,785

[45] Oct. 30, 1979

[54] PROCESS FOR THE SEPARATION OF CU++-IONS FROM SEWAGE, WASTE WATER AND AQUEOUS SOLUTIONS

[75] Inventors: Helmut Knorre, Seligenstadt; Gerhard Pohl, Hanau; Klaus Stützel, Bergen-Enkheim, all of Fed. Rep. of Germany

[73] Assignee: Deutsche Gold- und Silber-Scheideanstalt vormals Roessler, Frankfurt am Main, Fed. Rep. of Germany

[21] Appl. No.: 834,596

[22] Filed: Sep. 19, 1977

[30] Foreign Application Priority Data

Sep. 20, 1976 [DE] Fed. Rep. of Germany ....... 2642238

[51] Int. Cl.$^2$ ............................ C02B 1/20; C02C 5/04
[52] U.S. Cl. ........................................ 210/50; 210/52; 210/53; 210/54; 210/96.1; 423/43; 423/604
[58] Field of Search ............. 210/18, 42 R, 49, 50–54, 210/59, 63 R, 96 R; 423/37, 42, 43, 594, 604

[56] References Cited

U.S. PATENT DOCUMENTS

| 3,778,368 | 12/1973 | Nakamura et al. | 210/54 |
| 3,816,306 | 6/1974 | Roy | 210/50 |
| 3,931,007 | 1/1976 | Sugano et al. | 210/50 |

FOREIGN PATENT DOCUMENTS

| 2240549 | 3/1973 | Fed. Rep. of Germany. | |
| 50-85569 | 7/1975 | Japan | 210/63 R |
| 51-10176 | 1/1976 | Japan | 210/51 |

Primary Examiner—Charles N. Hart
Assistant Examiner—Peter A. Hruskoci
Attorney, Agent, or Firm—Beveridge, DeGrandi, Kline & Lunsford

[57] ABSTRACT

Copper (Cu++)-ions are separated from an effluent containing complexing agents which are ethylenediamine tetraacetic acid and/or diethylenetriamine pentaacetic acid or their anionic salts, by using an HS-containing triazine compound and Fe+++-ions in a quantity at least equal to the amount of complexing agent.

5 Claims, 1 Drawing Figure

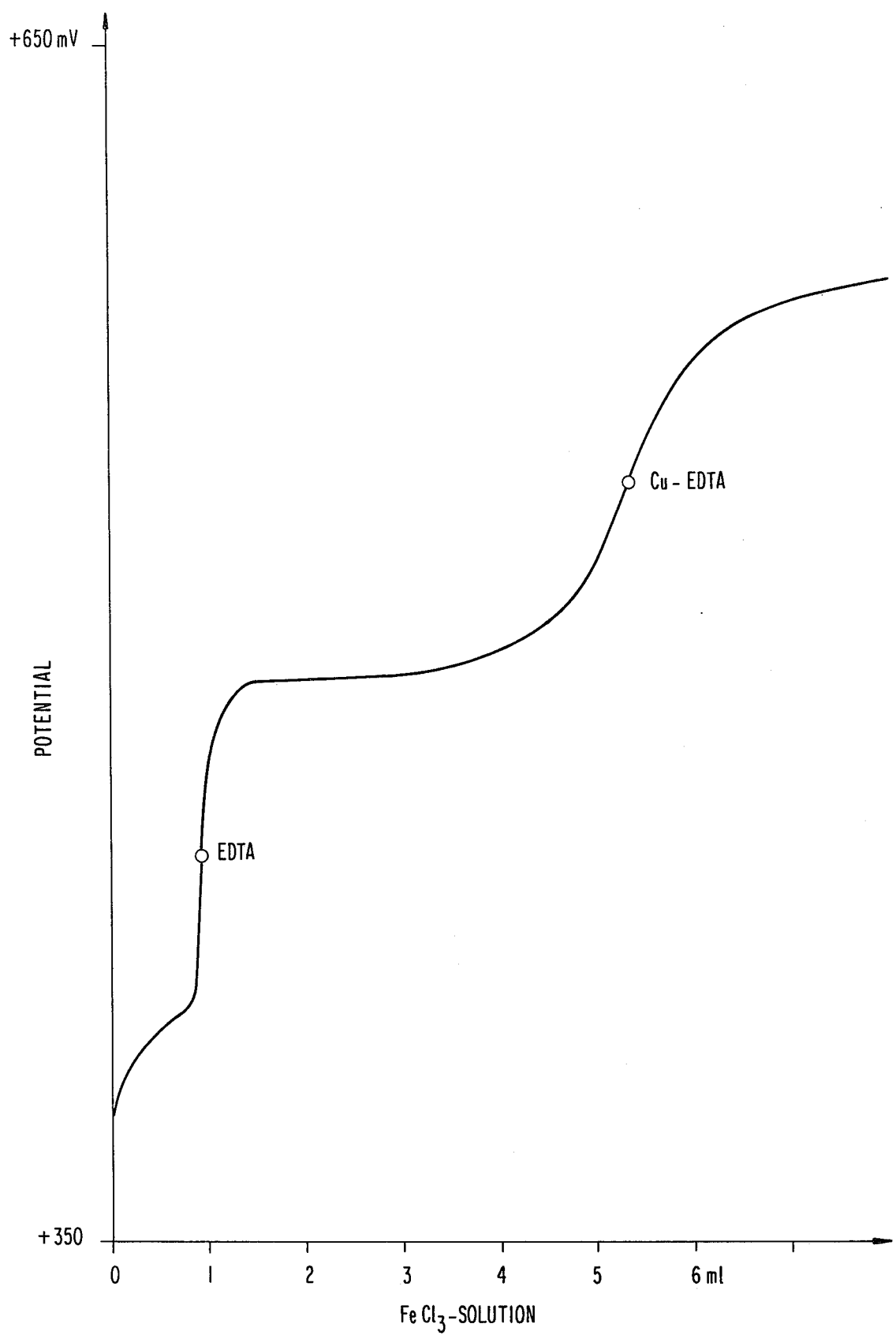

PROCESS FOR THE SEPARATION OF CU++-IONS FROM SEWAGE, WASTE WATER AND AQUEOUS SOLUTIONS

The present invention relates to a process for the separation of Cu++-ions from sewage, waste water and aqueous solutions which also contain ethylenediamine tetraacetic acid and/or diethylenetriamine pentaacetic acid or their anionic salts. The process employs an HS-containing triazine compound of the general formula

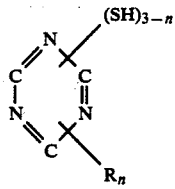

in which R is hydrogen, the same or different alkyl with 1 to 3 carbons, —NR$^1$R$^2$ or —OR$^3$;
R$^1$, R$^2$ and R$^3$ are hydrogen, the same or different alkyl with 1 to 6 carbons or phenyl;
n signifies a whole number from 0 to 2;
or of a water soluble salt of same compound as a precipitant.

From the German OS No. 2,240,549 is is known to precipitate Cu++-ions from aqueous solutions by means of an HS-containing triazine compound of the above defined type in the form of barely soluble deposits.

However, the precipitation of Cu++-ions will only succeed whenever the free metal ion concentration in the solution exceeds a certain minimum amount. Thus for example, it is not possible even with the use of a large excess of precipitant, to practicably completely precipitate Cu++-ions from an aqueous solution in which they exist as an ethylenediamine tetraacetate and/or diethylenetriamine pentaacetate complex. On the basis of high stability of the complexes, the free metal ion concentration in the solution is too low in this case for a precipitation to be effected.

The process of the invention is characterized by accomplishing the precipitation of the Cu++-ions in the presence of an at least equivalent quantity of Fe+++-ions, related to the content of the complexing agents in the solution, at a pH value between 4 and 10.

Surprisingly the Cu++-ions contained in the solution are essentially quantitatively precipitated as a barely soluble precipitate in the presence of the Fe+++-ions even if the concentration of the Cu++-ions is very low.

Particularly suitable precipitants for the process of the invention are the trismercaptotriazine of the formula:

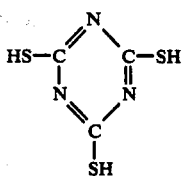

and its alkali metal salts.

In carrying out the present invention, the HS-containing triazine compounds or their water soluble salts are used in sufficient amount that at least one, preferably two to eight equivalents of mercapto or mercaptide groups are present per equivalent of Cu++-ions. It is advantageous that in the practice of the invention that the Fe+++-ions are present in a molar excess, related to the complexing agent content of the solution. Generally, there should be a molar excess of 10 to 200%, preferably 50 to 100%, based on the amount of complexing agent in the solution.

The required minimum concentration of Fe+++-ions in the solution, and at the same time the quantity of the HS-containing triazine compound or its water soluble salts required for the quantitative precipitation of the Cu++-ions may be determined in a very simple manner using potentiometric methods known in the art. For example, when using a pair of platinum/calomel electrodes, a discontinuous change of potential occurs whenever the added quantity of Fe+++-ions is precisely equivalent to the amount of complexing agent present in the solution. The consumption of Fe+++-ions determined by this method may serve as the stoichiometric measuring number of the amount of precipitant to be subsequently added. At the same time, one must take into consideration that an excess of precipitant will promote the quantitative precipitation of the Cu++-ions as an easily formed sediment which is a readily filterable precipitate.

The excess of HS-containing triazine compound or of its water soluble salt is not harmful in the sewage or waste water since these compounds appear to have no toxic effect on plant and animal life.

If desired or required, the Fe+++-ion complex present in the filtrate may be oxidatively destroyed by using hydrogen peroxide, the oxidation agent most compatible and least harmful to the environment, subsequent to the precipitation and separation of the Cu++-ions. At the same time, the complexing agent is eliminated in its function and the Fe+++-ions are separated as barely soluble Fe(OH)$_3$. The iron hydroxide deposit, after separation in a suitable acid, for example, hydrochloric acid, may be dissolved again. Then, the Fe+++-salt solution is available for a renewed sewage or waste treatment, so that in the process of the invention only the HS-containing triazine compound or its water soluble salt and the hydrogen peroxide are consumed. The Fe+++-salt can be recycled.

The optimal operating range for the addition of the Fe+++-salt solution lies at the pH values between about 3 and about 4; for the precipitation of the Cu++-ions at the pH values between about 4 and about 10, and for the precipitation of the Fe(OH)$_3$, after oxidation of the complexing agent with hydrogen peroxide, at a pH of 7 or above, preferably in the range of a pH of about 8. When treating very dilute Cu++-complex solutions, it is desirable to assist the coagulation and sedimentation of the precipitate with the HS-containing triazine derivative or its water soluble salt, by the addition of a conventional flocculant according to methods known in the art.

It is particularly recommended to carry out the process of the invention in such a way that the sewage or effluent to be treated or the solution to be treated is initially adjusted to a pH of about 4. Then an Fe+++-salt solution is introduced into the system in proper concentration while stirring at ambient temperature. The addition is carried out until the redox potential, measured with a pair of submerged platinum/calomel electrodes, changes suddenly; i.e. in a discontinuous manner. After determination of this point, at least a 10% excess of Fe$^{+++}$-ions, related to the theoretical consumption up to the end point of equivalence so determined, is then added. Subsequently, a quantity of the precipitant, advantageously in the form of a saturated solution of the sodium salt, at least equivalent to the consumption of Fe$^{+++}$-ions is added. The addition is made while stirring. Then the composition is adjusted with sodium carbonate or caustic soda solution to a pH value of about 5 to 7. This is restirred for about 15 minutes and finally the precipitate that is formed is separated by sedimentation or filtration.

The Fe$^{+++}$-ion complex in the filtrate can now be oxidized with hydrogen peroxide. For this purpose, the pH is effectively adjusted to slightly alkaline and hydrogen peroxide in the form of a 30 to 50% by weight aqueous solution is added while stirring until the Fe$^{+++}$-ions contained in the solution have quantitatively separated as a barely soluble Fe(OH)$_3$. The iron hydroxide deposit may then be filtered off and may again be converted with hydrochloric acid into a usable Fe$^{+++}$-salt solution. The latter can be recycled. The filtrate of the iron hydroxide precipitation may be discharged into the receiving body of water. Depending upon any existing regulations, the pH value of the effluent may be adjusted as desired.

The FIGURE is a plot of change in potential measured by a pair of platinum/calomel electrodes against consumption of a solution of iron chloride.

The present invention will be explained in further detail as will be apparent from the following non-limiting examples:

Comparative Example and Example 1

For carrying out the precipitation experiments, 200 ml. of a solution were used in each case. These were prepared by mixing 25 ml. of copper sulfate solution with 1.572 g. of CuSO$_4$·5H$_2$O/l, 10 ml. ethylenediamine tetraacetic acid (EDTA) solution with 7.03 g. of Na$_2$EDTA·2H$_2$O/l and 165 ml. of H$_2$O.

(a) Comparative Example

The Cu-EDTA solution was reacted while stirring at ambient temperature with 15 ml. of a 1% solution of the monosodium salt of trismercaptotriazine (TMT)

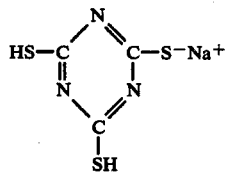

Then it was adjusted to a pH of 7.0 with a 10% sodium carbonate and was stirred again for 15 minutes. The initially blue solution turned to orange-red after the addition of TMT, but no precipitation took place.

(b) Example of invention

The Cu-EDTA solution was mixed while stirring at ambient temperature with 1 ml. of an iron-III-chloride solution (containing 100 g. of FeCl$_3$·6H$_2$O/l and 5 ml. of a 1% solution of the monosodium salt of trismercaptotriazine (TMT), it was then adjusted with 1.9 ml. of a 5% sodium carbonate solution to a pH of 7, it was again stirred for 15 minutes and was filtered through an analytical filter.

Result: No Cu was found anymore in the filtrate by means of atom absorption spectometry (AAS).

In the case of a repetition of the experiment with 10 ml. of a ten times diluted FeCl$_3$ solution, a residual content of 0.27 mg. of Cu/l was found by means of AAS.

Example 2

An iron-III-chloride solution with 10 g. of FeCl$_3$·6H$_2$O/l was added continuously to 200 ml of a Cu-EDTA solution of the same composition as stated in Example 1. The course of the potential was measured with a pair of platinum/calomel electrodes which were submerged in the solution and the results were recorded with a potentiometer. From the course of the curve of the potential (see the FIGURE) one can clearly recognize how much FeCl$_3$ solution was required for the complexing of the excess of EDTA as well as for the liberation of the Cu from the Cu-EDTA complex.

Subsequently 5 ml. of a 1% solution of the monosodium salt of trismercaptotriazine (TMT) were added to the Cu-EDTA solution mixed with 8 ml. of FeCl$_3$ solution. The pH of the solution was adjusted with 1.5 ml. of 5% sodium carbonate solution to 7, and it was again stirred for 15 minutes and filtered through an analytical filter. In the filtrate, a residual content of only 0.4 mg. Cu/l was detected by means of AAS.

The yellow filtrate was mixed subsequently while stirring with 2 ml. of H$_2$O$_2$ (30% by weight) and was allowed to stand at ambient temperature for about 24 hours. During this time, the iron contained in the solution was separated quantitatively as barely soluble Fe(OH)$_3$ and was separated by filtration.

Example 3

In order to test the separation of the copper with trismercaptotriazine, a sewage effluent as it occurs in practice was used and which is obtained as a condensate from an evaporation plant for chemical copper baths. The sewage contained about 30 mg. of Cu/l as an ethylenediamine tetraacetic acid (EDTA) complex and had a pH value of about 10.

500 ml. of this sewage effluent was adjusted with 1 ml. of a 10% hydrochloric acid to a pH of 4 while stirring at ambient temperature. This was then mixed with an iron-III-chloride solution (4 g. Fe$^{+++}$/l) until the redox potential of the solution, as measured with a pair of platinum/calomel electrodes, suddenly changed by about 130 mV. Then the same quantity of Fe$^{+++}$-solution was added as an excess so that a total requirement of 6.6 ml. of Fe$^{+++}$-solution per 500 ml. of sewage resulted. Subsequently, 6.6 ml. of a 1.2% solution of the monosodium salt of trismercaptotriazine was added with stirring. The pH of the system was adjusted with 4 ml. of a 20% sodium carbonate solution to a pH of 7 and was again stirred for 15 minutes. Then the solution was filtered through an analytical filter.

Result: A residual content of 0.45 mg. Cu/l was found in the filtrate by means of AAS which met the local regulations concerning this type of effluent.

Example 4

A waste concentrate which originated from the bath overflow of a chemical copper bath, contained 1.8 g. of Cu/l as well as 49.4 g. of EDTA Na$_2$·2H$_2$O/l and had a pH value of 8.9.

An iron-III-chloride solution (20 g. Fe$^{+++}$/l) was continuously added to 1000 ml. of this concentrate at ambient temperature and while stirring until the redox potential of the solution measured with a pair of platinum/calomel electrodes changed in a sudden or discontinuous manner by about 160 mV. To achieve this condition, 368 ml. of Fe+++-solution were needed. Subsequently, 151 ml. of the Fe+++ solution and 50 ml. of a solution of trismercaptotriazine trisodium salt (224 g. TMTNa3/l were added once more while stirring. The solution was adjusted to a pH of 7 and it was stirred again for 15 minutes. After about 8 hours, the composition was filtered through an analytical filter and the residual content of copper in the filtrate was analyzed by means of AAS; it amounted to 0.7 mg. of Cu/l. That means that in this case too, the separation of the copper met the applicable sewage effluent regulations.

The filtrate of the copper precipitation was subsequently heated to 60° C. and was slowly mixed with 410 ml. of H2O2 (30% by weight). After 4 hours, the Fe(OH)3 precipitate was filtered off and the filtrate was analyzed.

Result: After this treatment, the filtrate was free of heavy metal ions.

Example 5

A sewage effluent supplied to a special garbage removal plant contained 480 mg. of Cu/l EDTA as the complexing agent and large quantities of Fe-salts. For the purpose of separating the copper, 5 m³ of this acid sewage was adjusted first of all with soda lye to a pH~4 and was then mixed while stirring with 40 l. of a trismercaptotriazine trisodium salt solution (206 g. of TMTNa3/l). Subsequently, the pH was adjusted to 7, and it was stirred again for 30 minutes and after adding the same volume quantity of a pumpable galvanic sludge, it was filtered at pH~8 via a filter press. No copper was found in the filtrate.

Example 6

200 ml. of a CuSO4 solution (7.859 g. of CuSO4·5H2O/l) was mixed with 63 ml. of an 0.1 M DTPA-pentasodium salt solution and 137 ml. of water.

To this solution was added, while stirring at ambient temperature, 52.8 ml. of an iron-III-chloride solution (20 g. of Fe+++/l). Subsequently, 38 ml. of a trismercaptotriazine trisodium salt solution (201 g. TMTNa3/l) were added. Then the pH of the reaction mixture was adjusted to 7 with 6 ml. of 10% HCl, it was stirred again for 15 minutes and after 2 hours it was filtered through an analytical filter.

Less than 1 mg. of Cu/l could be detected in the filtrate by AAS. While the invention has been illustrated using iron chloride solutions, it is to be noted that other ionizable iron salts soluble in water may be used for this purpose as will be apparent to the skilled worker.

Further modifications and variations of the invention will be apparent to those having skill in the art and are intended to form a part of this invention and are encompassed by the following claims.

We claim:

1. A process for the separation of Cu++-ions from an aqueous liquid in which said Cu++ ions exist as complexes of ethylenediamine tetraacetic acid and/or diethylenetriamine pentaacetic acid or their anions, comprising contacting said liquid with an HS-containing triazine compound of the general formula

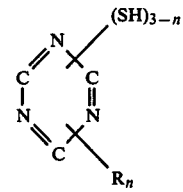

in which:
R is hydrogen, the same or different alkyl with 1 to 3 carbons, —NR¹R² or —OR³;
R¹, R² and R³ are hydrogen, the same or different alkyl with 1 to 6 carbons or phenyl;
n is a whole number from 0 to 2,
or of a water soluble salt to precipitate said Cu++ ions, and wherein said compound is contacted in an amount such that at least one equivalent of mercapto or mercaptide groups is present per equivalent of said Cu++ ions and the precipitation of the Cu++-ions takes place in the presence of an at least equivalent quantity of Fe+++-ions, related to the complexing agent content in the liquid, and at a pH value between 4 and 10, and separating the precipitate from the aqueous liquid.

2. A process as in claim 1 wherein the precipitation of Cu++-ions takes place in the presence of a molar excess of Fe+++-ions in the amount of 10 to 200%, related to the complexing agent content in the liquid.

3. A process as in claim 1 wherein the precipitation of Cu+++-ions takes place in the presence of a molar excess of Fe+++-ions in the amount of 50 to 100%, related to the complexing agent content in the liquid.

4. A process as in claim 1 wherein the concentration of Fe+++-ions in the solution is arrived at by potentiometric indicated addition of an aqueous Fe+++-salt solution.

5. A process as in claim 1 wherein filtration is used to separate the precipitate and subsequent to the precipitation and separation of the Cu++-ions, hydrogen peroxide is added to the filtrate containing a Fe+++-ion complex at pH values above 7 and thereby precipitation the Fe+++-ions and separating barely soluble Fe(OH)3.

* * * * *